April 17, 1934.    C. G. BEERSMAN    1,955,168
ELECTRICAL OUTLET DEVICE
Filed April 10, 1933
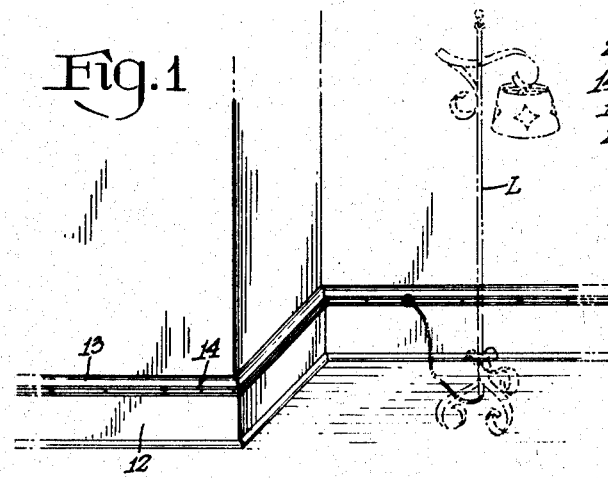
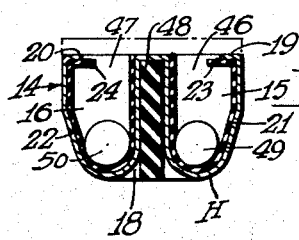
Inventor:
Charles G. Beersman
BY: Wm O Belt
Atty.

Patented Apr. 17, 1934

1,955,168

UNITED STATES PATENT OFFICE 1,955,168

ELECTRICAL OUTLET DEVICE

Charles G. Beersman, Evanston, Ill.

Application April 10, 1933, Serial No. 665,303

17 Claims. (Cl. 247—3)

This invention relates to electrical outlet devices of the kind providing a plurality of places whereat the attachment means of electrical appliances or the like may be connected in electric circuits in which the outlet devices are included.

Electrical conductors are preferably enclosed in metal housings to reduce the fire hazard and to better protect the conductors, and one of the objects of my invention is to provide an electrical outlet device embodying electrical conductors to which attachment plugs or the like may be connected at a plurality of places and to enclose such electrical conductors in a metallic housing.

Another object of my invention is to effectively insulate electrical conductors from the metallic housing in which they are mounted and wherein they are isolated one from the other to prevent short circuiting.

Still another object is to provide an electrical outlet device wherein the metallic housing, the conductors, and the insulation may be assembled as a unit to facilitate handling and shipping thereof and to which a face plate may be detachably connected to complete the enclosure of the electrical conductors, and an ancillary object is to provide a face plate which may be made in a plurality of finishes so that it may be blended or contrasted with the finish of the parts with which the electrical outlet device is associated.

Further objects are to facilitate the insertion of the prongs of the attachment plugs or the like by providing guides for directing these prongs into the openings into which they are adapted to be inserted and to so arrange the openings and the prongs that the attachment plugs or the like may be connected to the outlet device in but one way to thereby utilize polarization of the conductors in the electrical outlet device.

Still further objects are to provide an electrical outlet device which may be installed in accordance with the laws, ordinances and the like regulating the installation of electrical equipment; to provide an outlet box which may be expeditiously associated with the electrical outlet device to facilitate the installation thereof in the required manner and to facilitate interconnection of separated units of my outlet device; to mechanically unite and electrically bond the metallic housings of adjacent sections of my electrical outlet device when sections thereof are arranged in endwise alignment to provide an elongated outlet device; to electrically interconnect the conductors in adjacent sections of my outlet device arranged in endwise alignment and to arrange the interengagement of the conductors of aligned sections out of alignment with the interengagement of the insulation in the respective sections; to provide standard parts for use at corners to facilitate interconnection of sections of my outlet device extending in opposite directions from a corner; to provide parts for use at corners so arranged that wires or the like may be passed therethrough to interconnect sections of my outlet device; to provide connectors for attaching wires or the like to the electrical conductors in my outlet device; and to provide an electrical outlet device of simple and economical construtiton and which may be expeditiously installed.

Selected embodiments of the invention are illustrated in the accompanying drawing wherein Fig. 1 is a perspective view showing an adaptation of my invention;

Fig. 2 is a front elevation in which certain parts are broken away;

Fig. 3 is a fragmentary rear elevation;

Fig. 4 is a front elevation illustrating the manner in which two adjacent sections are joined;

Fig. 5 is a sectional detail view taken substantially on the line 5—5 on Fig. 2;

Fig. 6 is a perspective detail view of a connector;

Fig. 7 is a sectional detail view taken substantially on the line 7—7 on Fig. 2;

Fig. 8 is a sectional detail view taken substantially on the line 8—8 on Fig. 2;

Fig. 9 is a sectional detail view of the outlet box and is taken substantially on the line 9—9 on Fig. 2;

Fig. 10 is a perspective detail view of the corner members; and

Fig. 11 is a fragmentary sectional view similar to Fig. 8 showing a modified form of the invention.

In the drawing, 12 indicates a baseboard and 13 indicates the molding usually mounted above a baseboard. The baseboard may be routed to provide a groove or the molding may be spaced from the upper edge of the baseboard to provide a groove, and my improved outlet device, generally indicated by 14, is mounted in the groove so provided. My outlet device has openings in the front at regularly spaced intervals, say, for example, every twelve inches, through which the prongs of attachment plugs may be inserted to connect electrical devices, such as the lamp L, in an electric circuit of which my outlet is a part. While I provide openings at regularly spaced intervals, it is to be understood that openings may be provided as required so that when a number of closely associated electrical devices are to be connected in the circuit, juxtaposed separate openings will be provided for the attachment plugs of the several electrical devices.

The illustrated embodiment of my invention includes a sheet metal housing H in the form of an elongated strip bent to provide independent parallel channels 15 and 16 which open into the front face of the housing, and these channels are interconnected by a web 17 integral with the housing and disposed in the front face thereof. Thus, a separating channel 18 is provided between the channels 15 and 16 and this separating channel opens into the rear face of the housing. The marginal edges of the housing on the outer sides of the channels 15 and 16 are bent to provide inwardly directed flanges 19 and 20. The housing H as thus bent provides separated channels in which the electrical conductors may be installed to be electrically isolated.

In the respective channels 15 and 16 I provide strips of insulating material 21 and 22 which are rested against the inner faces of the channels and which are complementary to the channels. The strips 21 and 22 include inwardly directed flanges 23 and 24 at the outwardly disposed edges thereof and these flanges underlie the flanges 19 and 20 but project inwardly in a greater amount than said flanges 19 and 20. The inwardly disposed edges of the strips 21 and 22 terminate in alignment with the outer face of the web 17.

The electrical conductors 25 and 26 are preferably made of copper or similar material and are somewhat U-shaped in configuration. These conductors 25 and 26 include rounded sections 27 and 28 at the inner or bight portions thereof, and these rounded sections rest against the strips 21 and 22 at the bottoms of the channels. Parallel webs 29 and 30 extend across the channel 15 from the rounded section 27 and the web 29 terminates in an outwardly flared portion 31, the free marginal edge of which underlies the flange 23. The web 30 terminates in an inwardly directed flange 32 which abuts the adjacent portion of the insulating strip 21 in spaced relation with the open front face of the channel 15. Parallel webs 33 and 34 extend across the channel 16 from the rounded section 28, and the web 33 terminates in an inwardly directed flange 32' that abuts the adjacent part of the insulating strip 22 in substantial alignment with the inwardly directed flange 32. The web 34 terminates in an outwardly flared portion 35, the free marginal portion of which underlies the flange 24. The webs 29 and 30 are parallel but are separated to provide a space into which a prong such as 36 of an attachment plug 37 may be extended. The webs 33 and 34 are parallel but separated to provide a space into which the prong 38 of the attachment plug may be inserted.

The conductors 25 and 26 are preferably made of resilient material and the free marginal edges thereof extend in opposite directions. Prior to installation of the conductors in the channels, the webs thereof are not parallel but when the conductors are inserted into the channels, the webs are brought into parallel relation and are thus placed under tension. Therefore, these webs effectively grip the prongs of the attachment plug and effect good electrical connection and obviate sparking and the like.

Preferably, the housings H are made up in standard lengths, say, for example, in six or twelve foot lengths. When this is done the insulating strips 21 and 22 and the conductors 25 and 26 are also made up in standard lengths corresponding to the length of the housing. In assembling these parts, the insulating strips may either be inserted into the channels in the housing from the ends of the channels or they may be passed into the channels through the open front faces thereof. The sides of these insulating strips, prior to installation in the channels, are spaced apart in an amount greater than the width of the channels so that when these strips are installed in the channels they are under tension. Further, the flanges 23 and 24 on the insulating strips underlie the flanges 19 and 20 on the housing and this coupled with the tension of the strips effectively retains the strips in the housing. The conductors, like the insulating strips, may either be inserted into the channels from the ends thereof or through the open front faces thereof. As explained, these conductors are under tension when installed in the channels, and this tension coupled with the disposition of the outer marginal sections of the conductors under the flanges 23 and 24 effectively retains the conductors in the housing. Assemblies of this kind will be referred to hereinafter as outlet device sections.

In installation, a plurality of the outlet device sections may be arranged end to end to provide the desired length. The sections may be conveniently cut with a hack saw or the like so that any required length may be obtained.

The front faces of the outlet device sections are adapted to be closed by face plates 39 preferably made of insulating material. These plates are made up in lengths corresponding to the length of the outlet device sections but are not secured to the sections until the outlet device is being installed. Inasmuch as the assemblies providing the outlet device sections are self-contained they may be shipped and handled independently of the plates 39. This is quite advantageous for it is desirable that the finish of the plate 39 correspond with the finish of the baseboard or the like with which my electrical outlet device is used. Since the plates 39 may be handled and stored independently of the outlet device sections it is possible to stock a number of these plates in different finishes. Then when an outlet device section is to be installed, a face plate having the desired finish is furnished with the section.

Fig. 4 illustrates the manner in which the outlet device sections are interconnected when laid end to end. As illustrated, the ends of the housings H and the strips 21 and 22 therein are abutted in alignment while the ends of the conductors 25 and 26 in these abutted outlet device sections are interengaged out of alignment with the abutment of the housings H and insulating strips 21 and 22. If desired, however, the abutment of all the respective parts may be staggered, that is to say, the ends of the housings H may be abutted at one place while the abutment of the insulating strips 21 and 22 may be spaced from this abutment, and the abutment of the conductors 25 and 26 may be spaced from both of these abutments or, if desired, this abutment may be aligned with the abutment of the ends of the housings H. By so staggering the abutment of the ends of the various parts of the adjacent sections the rigidity of the interconnection is increased. Moreover, when the conductors 25 and 26 are abutted out of alignment with the abutment of the aligned strips 21 and 22, burrs or the like on the ends of the conductors 25 and 26 are effectively prevented from contacting with the metallic housings and when the abutments of the insulating strips and the conductors are staggered, as described, uninterrupted installation is provided around the edges of the abutments of the conductors.

The abutted conductors 25 and 26 of adjacent sections are electrically interconnected by suitable means such as the slugs S which, in the illustrated embodiment, are in the form of flat copper bars which are inserted between the parallel webs of the abutted conductors, and these bars are tightly clamped between webs in the same manner as that in which the prongs of the attachment plugs are gripped between these webs. This mechanically unites the aligned conductors in the adjacent outlet device sections and also electrically interconnects them.

It is common practice to ground metallic housings enclosing electrical conductors and likewise it is common practice to bond such metallic housings at places whereat adjacent sections thereof are joined. I therefore provide metallic slugs 40 which are inserted into the end portions of the separating grooves 18 of adjacent housings H to be joined together, and these slugs underlie the webs 17 and serve to mechanically interconnect and electrically bond the abutted housings. Openings 41 are provided in the webs 17 and tapped openings 42 are provided in the slugs 40 to align with the openings 41. Likewise, openings 43 are provided in the plates 39. Machine screws 44 may be freely passed through the openings 43 and 41 and threaded into the tapped openings 42 when the plates 39 are arranged over the housings and the slugs 40 are properly installed. Preferably the screws 44 are of the self-centering kind to facilitate alignment of the openings in the three parts for this expedites insertion of the screws. Thus, screws at the ends of adjacent outlet device sections serve a triple function, that is to say, they retain the plates 39 and the slugs 40 in position and they interconnect the adjacent sections to the slugs and therefore to each other.

The plates 39 are provided with openings at regular intervals and the webs 17 are perforated at regular intervals correspondingly to the spacing of the openings in the plates 39. Thus, screws may be inserted into these openings to securely fasten the plates on the housings H. Some of these will be machine screws merely for the purpose of connecting the plates in the housings but others will be wood screws, such as 45, and will be freely passed through all of the openings and they will then be run into the wall at the bottom of the groove in which the outlet device is installed to secure the outlet device in the groove.

I have described my electrical outlet device as being adapted for use in connection with a baseboard but it is to be understood that this is merely illustrative for the device is equally adaptable for use with a dado molding or in the molding along a counter or about a table or it may be provided on a desk or it may be arranged above a work bench, and there are many other uses to which it may be put. In many of these installations the ends of the outlet device will be open and to prevent tampering and to protect the conductors against being short circuited or damaged I provide an end cap of the kind illustrated in Figs. 2 and 5. This end cap, generally indicated by 46, includes a plate 47, the marginal edges of which are shaped to correspond to the cross sectional outline of the housing H. This plate is adapted to close the end of the housing when installed thereon. A tongue 48 projects from the medial portion of the plate 47 and is adapted to be disposed in the separating channel 18. A tapped opening is provided in the top of the tongue to receive a machine screw 44 or through which a wood screw 45 may be freely passed, to interconnect the plate 39, the strip 14, and the end cap 46 when installed. Projecting from the plate 47 parallel with the tongue 48 are two bosses 49 and 50 adapted to respectively project into the channels 15 and 16 and rest on the bights of the insulating strips 21 and 22. These bosses 49 and 50 engage the adjacent ends of the respective conductors 25 and 26 to hold the ends of the conductors in spaced relation with the ends of the insulating strips and the housing H. Thus, the end cap 46 effectively closes the end of the housing and protects the conductors 25 and 26.

Shallow grooves 51 and 52 are provided in the front faces of the plates 39 and these grooves are located to be aligned respectively with the spaces between the webs 29 and 30 and the webs 33 and 34 when the plates are installed on the housings H. At regularly spaced intervals in these grooves say, for example, every twelve inches, openings 53 and 54 are provided and the prongs 36 and 38 of the attachment plugs 37 are adapted to be passed through these openings 53 and 54 to engage the conductors 25 and 26. Preferably, the conductors 25 and 26 are polarized. For example, the conductor 26 may be grounded while the conductor 25 may be hot to ground. To utilize this polarization of the conductors, I form the openings 53 to be of greater length than the openings 54 and likewise I form the prongs 36 to be of greater width than the prongs 38. Therefore, if the conductors leading from the attachment plugs 37 are properly connected to the electrical devices to which they lead, it will be impossible to improperly connect these electrical devices for the wide prongs 36 will not pass through the narrow openings 54 and therefore the attachment plugs can only be connected to my outlet device in one way. The grooves 51 and 52 greatly facilitate connection of the attachment plugs for it is only necessary to find the grooves 51 and 52 with the prongs 36 and 37, then by sliding the attachment plug along the grooves the prongs will pass into the respective openings 53 and 54 when these prongs align with the openings.

The electrical codes of the various municipalities throughout the country and other like regulations limit the number of outlets that may be provided in each circuit. Furthermore, when the outlet device is installed in a room it will be necessary to interrupt it at openings in the walls such as doorways and to clear book cases or the like. Hence, I provide means for connecting the various independent units of my outlet device in proper circuits also for interconnecting spaced units. To this end I provide an outlet box 55 and one or more such outlet boxes will be provided for each of the units of my outlet device. These outlet boxes 55 are sized to fit into the grooves adapted to receive the housings H. Substantially U-shaped strips 56 are secured at opposite ends of each outlet box 55, and these strips include spaces 57 into which the end portion of a slug 40 may be inserted. An opening 58 is provided in the bight of each of the strips 56 so that screws may be passed therethrough and screws so installed interconnect the outlet boxes 55 to the plates 39 and to the slugs 40 which are connected to the adjacent ends of the sections of my outlet device abutting the outlet box. Under conditions whereat only one of the outlet device sections engages the outlet box, the open end of the box will be closed by an end cap 46. An opening 59 is provided in the back wall of the outlet box 55 in alignment with the opening 58 so that a wood screw 45 may be used in place of a machine screw 44, and such a wood screw will be passed through the opening 59 to thereby secure the outlet box in position. Another opening 60 is provided in the back wall of the outlet box through which a wood screw may be passed to connect the outlet box in position in event a machine screw 44 is employed instead of a wood screw 45.

An opening 61 is provided in the rear wall of the outlet box 55 and the usual means are provided for attaching conduit or other conductor housing member to the outlet box. Conductors 62 and 63, which may be approved insulated wire or the like, lead from the conductor housing member through the opening 61 into the outlet box. These conductors are individually connected to the conductors 25 and 26. To facilitate the interconnection of the conductors 62 and 63 with the conductors 25 and 26 I provide connectors such as that illustrated in detail in Fig. 5. This connector, generally indicated by 64, includes a main body 65 having an opening 66 (Fig. 7) extending thereinto from one end thereof. The end of the conductor 62 is passed into this opening 66 and is secured therein by a set screw 67' or the like. A blade 67 extends from the opposite end of the main body and is adapted to be disposed between the webs 29 and 30 to mechanically and electrically connect the conductor 62 to the conductor 25. So as to effectively insulate the connector 64 from the metallic housing H, the conductor 25 is terminated inwardly of the end of the housing and the insulating strip 21 and therefore when the connector 64 is disposed in the channel 15 it is electrically insulated from the housing H when it is arranged inwardly of the end of the section of my electrical outlet device abutting the outlet box 55. The conductor 63 is connected in the main body 68 of the connector 69, similar to the connector 64, in the same manner as that in which the conductor 62 is connected in the main body 65. The connector 69 is arranged in the channel 16 in the same manner as the connector 64 is arranged in the channel 15 and this connector 69 includes a blade 70 that is disposed between the webs 33 and 34 to mechanically and electrically connect the conductor 63 to the conductor 26.

When my improved electrical outlet device is installed in a baseboard or other similar member in a room, it may be necessary to go around a corner as where there is an offset in the wall such as that shown in Fig. 1 wherein both inside and outside corners are shown. To this end I provide an inside corner member 71 and an outside corner member 72 (Fig. 10). A cross section of these corner members corresponds to a cross section of the housing H. The inside corner member includes channels 73 and 74 adapted to be respectively aligned with the channels 15 and 16. The outside corner member includes channels 75 and 76 also adapted to be respectively aligned with the channels 15 and 16. A medially located web 77 is provided on the inside corner member 71 and a similarly located web 78 is provided on the outside corner member 72, and these webs are adapted to be aligned with the webs 17 of outlet device sections cooperating with the corner members. The corner member 71 includes a separating channel 79 and the corner member 72 includes a separating channel 80, and these channels are adapted to be aligned with separating channels 18 of outlet device sections abutting the ends of the corner members. In Fig. 10 I show the two corner members arranged in cooperating relation, and the abutting ends thereof are interconnected by a slug 40 which is arranged in the respective channels 79 and 80. The slug, when so arranged, is retained in position in the manner previously described. This is illustrative of the manner in which the corner members are connected to outlet device sections.

Usually no attachment openings will be desired in the portion of the outlet device on an offset in a wall and therefore I may omit insulating strips 21 and 22 and conductors 25 and 26 from the corner members and any housing sections interconnecting the ends of adjacent corner members. Then in place of the insulating strips and conductors I direct wires through the channels 73 and 74 and channels 75 and 76 and also through the channels 15 and 16 of any section of housing H intermediate the ends of the corner members. The ends of these wires are attached to connectors, such as 64, which are mounted in the ends of the outlet device sections, equipped with insulating strips 21 and 22 and conductors 25 and 26, and which abut the ends of the corner members. However, when the space between inside and outside corners is substantial, as illustrated in Fig. 1, it may be desirable to provide attachment openings in this wall, such openings being illustrated in Fig. 1. When this is done, the ends of the inside and outside corner members extending toward each other abut the ends of a section of housing H equipped with insulating strips 21 and 22 and conductors 25 and 26 and in this instance wires are passed only through the corner members and the ends of these wires are attached to connectors, such as 64, arranged in the ends of the outlet device sections abutting the ends of the corner members.

By the use of connectors, such as 64, and by passing wires through the corner members I obviate the necessity of providing special arrangements in the corner members and need only provide metallic housings such as those illustrated in Fig. 10. This is economical and at the same time it provides a very flexible arrangement for it permits portions of the outlet device at an offset in the wall to be equipped to have attachment openings therein or by merely running wires through the metallic housings I may eliminate attachment openings in these portions.

Heretofore I have described the insulating strips in the channels 15 and 16 as being independent. This, however, is not necessary and in Figure 11 I have shown insulating strips for each of the grooves 15 and 16 which are interconnected by a web 81 that overlies the web 17. While this arrangement for the insulating strips is somewhat more expensive, it assures complete coverage of the metallic housing and under certain conditions may prove to be more satisfactory than independent insulating strips.

The metal housing H and the conductors 25 and 26 may be made from strip sheet metal which may be successively passed through suitable rollers to trim and fold the strips into the desired size and cross sectional shape. Some insulating materials may also be handled in this way but certain insulating materials will need to be molded into the desired shape, but it is to be understood that the housing and the conductors and the insulating strips may be made in any desired manner and from different kinds of material without departing from the purview of my invention.

The electrical outlet device of this invention may be assembled in units of standard lengths and these units may be handled and shipped without a face plate being attached thereto for the insulating strips and conductors in the outlet device sections are firmly held in the metallic housings by reason of the innate resiliency of the insulating strips and the conductors and also because of the interengaged flanges. The face plates may be made up in a number of desired finishes and a face plate corresponding to the finish of the parts with which the outlet device is to be associated may be selected and united with the outlet device upon installation thereof. Both the face plates and the outlet device sections may be expeditiously cut into any desired length and in this way an outlet device may be provided along any wall irrespective of the length thereof for sections of the proper lengths may be laid end to end to provide the desired aggregate length or a standard length section may be cut to provide a short section. The conductor strips in outlet device sections arranged in endwise alignment may be expeditiously connected by detachable slugs which are firmly held in position by reason of the innate resiliency of the conductors and the shape of the parts between which the interconnecting slugs are arranged.

When the outlet device is arranged above a work bench or at other places whereat the ends thereof are open, a convenient end cap is provided which effectively closes the end of the outlet device and protects the electrical conductors therein.

The conductors are housed in metallic housing which reduces the fire hazard and likewise effectively protects the conductors. Moreover, effective insulation is provided for the conductors. Since the flanges on the insulating strips extend inwardly of the ends of the flanges on the metallic housings, the prongs of attachment plugs inserted into the device are held against engagement with the housing. The insulation also effectively protects the conductor strips against short circuiting and grounding and this is augmented by staggering the abutments of aligned insulating strips and conductors.

The insertion of attachment plugs is facilitated by the grooves provided in the face plate. Moreover, when the outlet device is polarized by the differently sized openings in the face plates and the differently sized prongs on the attachment plugs prevent improper connection of the attachment plugs in the circuit of which the outlet device is a part.

The outlet device may be expeditiously directed around corners in a wall or the like by the provision of standard corner members and the cost of the installation is kept down by providing corner members consisting of housings through which properly insulated wires may be passed. By providing simple connectors of the kind illustrated and described herein the wires may be expeditiously connected to the conductors in the outlet device. These conductors also facilitate the connection of the outlet device in an electric circuit and this connection is further facilitated by the provision of the simple and economical outlet box described herein. Moreover, by providing such outlet box at adjacent ends of separated units of my outlet device it is possible to clear openings in the wall of a room or other interruptions such as book cases or the like.

While I have illustrated and described a selected embodiment of my invention it is to be understood that this is capable of variation and modification and I therefore do not wish to be limited to the precise details set forth but desire to avail myself of such changes and alterations as fall within the purview of the following claims:

I claim:

1. An electrical outlet device comprising a sheet metal housing bent to provide an open face channel and including a flange overlying said channel at one edge thereof, a strip of insulating material in said channel and providing a lining therefor and including a part underlying the flange on said housing, and a resilient folded conductor strip mounted in said insulating strip under tension and tending to expand to thereby secure itself and said insulating strip in said metal housing.

2. An electrical outlet device comprising a sheet metal housing bent to provide independent open face channels and including flanges overlying said channels at similarly disposed edges thereof, independent strips of insulating material in said channels and providing linings therefor and including parts underlying the flanges on said housing, and independent resilient folded electrical conductor strips mounted in said insulating strips under tension and tending to expand to thereby secure themselves and said insulating strips in the channels in said metal housing.

3. An electrical outlet device comprising a sheet metal housing bent to provide independent open face channels and including flanges overlying said channels at similarly disposed edges thereof, a strip of insulating material bent to provide channels disposed in and affording linings for the channels in said metal housing and including parts underlying the flanges on said metal housing, and independent resilient folded electrical conductor strips mounted in the channels in said insulating strip under tension and tending to expand to thereby secure themselves and said insulating strip in the channels in said metal housing.

4. An electrical outlet device comprising a sheet metal housing bent to provide an open face channel and including a flange overlying said channel at one edge thereof, a strip of insulating material in said channel and providing a lining therefor and including a part underlying the flange on said housing, and a resilient conductor strip bent to provide substantially parallel contact engaging portions and outwardly projecting portions adapted to engage the sides of the insulating strip in said channel to thereby place said conductor strip under tension whereby it tends to expand to thereby secure itself and said insulating strip in said metal housing.

5. An electrical outlet device comprising elongated housings having spaced parallel channels therein opening through the front faces thereof and having webs connecting the adjacent sides of the channels to provide separating channels opening through the rear faces of said housings, conductors retained in said parallel channels, and means connected to said housings and disposed in the separating channels of housings arranged in endwise alignment to interconnect the aligned housings.

6. An electrical outlet device comprising elongated metallic housings having spaced parallel channels therein opening through the front faces thereof and having webs connecting adjacent sides of the channels to provide separating channels opening through the rear faces of said housings, conductors mounted in said parallel channels and insulated from said metallic housings, and a metallic bar connected to said housings and disposed in the separating channels of housings arranged in endwise alignment to mechanically interconnect and electrically bond the aligned housings.

7. An electrical outlet device comprising elongated housings having spaced parallel channels therein opening through the front faces thereof and having webs connecting the adjacent sides of the channels to provide separating channels opening through the rear faces of said housings, conductors retained in said parallel channels, said webs having openings therein in spaced relation with the ends of the housings, a metallic slug having openings therein and adapted to be disposed in the separating channels of housings arranged in endwise alignment, and means extended through the openings in said webs and the openings in said metallic slug to interconnect the aligned housings and said slug and mechanically unite and electrically bond said metallic housings.

8. An electrical outlet device comprising a sheet metal housing bent to provide independent open face channels and having a web interconnecting adjacent sides of said channels and including a flange at the outer sides of and overlying said channels and extended in the plane of said web, strips of insulating material lining said channels and including parts underlying said flanges, folded resilient conductor strips mounted in said insulating strips under tension and tending to expand to thereby retain themselves and said insulating strips in said channels, said conductor strips including substantially parallel contact engaging portions arranged medially of said channels and adapted to receive therebetween contacts passed thru the open face of said channel, and a plate closing the open face of said channel and rested on said web and said flanges and having openings therein thru which said contacts may be passed.

9. A face plate for an electrical outlet device having spaced parallel shallow prong locating and guiding grooves in the face thereof, said plate having aligned openings in said grooves arranged at spaced intervals throughout the length thereof whereby prongs of an attachment plug passed along said grooves may enter said openings.

10. A face plate for an electrical outlet device having spaced parallel shallow prong locating and guiding grooves in the face thereof, said plate having spaced openings extending therethrough from one of said grooves at spaced intervals, and said plate having other openings aligned with the first openings and extending through the plate from the other of the grooves, the openings in one of said grooves being of greater length than the openings in the other of said grooves whereby prongs of different widths on an attachment plug or the like may be passed through said openings in but one way when said prongs are slid along said grooves and into alignment with said openings.

11. An electrical outlet device comprising an elongated housing having spaced parallel channels opening through one face thereof, conductors retained in said parallel channels, a face plate for closing the open front side of said housing, and an end cap secured at the end of said housing and including parts engageable with the ends of conductors in said parallel channels to space the end of said conductors from the end of said housing, said end cap closing the end of said housing whereat it is mounted.

12. An end cap for an electrical outlet device comprising a flat plate, a tongue projecting from one face of said flat plate, and bosses extending from said flat plate parallel with said tongue and positioned on opposite sides of said tongue.

13. An electrical outlet device comprising an elongated metallic housing having a channel therein opening through one face thereof, an insulating strip in said channel, and a conductor mounted in said channel inwardly of said insulating strip and including spaced parallel portions, said conductor being terminated in spaced relation with the ends of said insulating strip and said housing, and a connector for attaching a wire or the like to said conductor and including a main body adapted to be disposed in said channel between the end of said conductor and the end of said insulating strip, a blade extending from said body and adapted to be held between said spaced parallel portions of said conductor, and means in said main body for connecting the wire or the like thereto.

14. An electrical outlet device comprising a sheet metal housing bent to provide an open face channel and including a flange overlying said channel at one edge thereof, a strip of insulating material in said channel and providing a lining therefor and including a part underlying the flange on said housing, a resilient folded conductor strip mounted in said insulating strip under tension and tending to expand to thereby secure itself and said insulating strip in said metal housing, a corner member adapted to have one end thereof abutted with one end of said housing and including a channel, an insulated wire in the channel in said corner member, and means including a part engageable with said conductor strip and having means for attaching the end of said wire thereto to thereby connect said wire to said conductor strip.

15. An electrical outlet device comprising a sheet metal housing bent to provide an open face channel and including a flange overlying said channel at one edge thereof, a strip of insulating material in said channel and providing a lining therefor and including a part underlying the flange on said housing, a resilient folded conductor strip mounted in said insulating strip under tension and tending to expand to thereby secure itself and said insulating strip in said metal housing, a corner member adapted to have one end thereof abutted with one end of said housing and including a channel, a corner member bent transversely similarly to said metal housing and providing a channel and being adapted to have one end thereof abutted with one end of said housing, an insulated wire in the channel in said corner member, and means including a part engageable with said conductor strip and having means for attaching the end of said wire thereto to thereby connect said wire to said conductor strip.

16. An electrical outlet device comprising a sheet metal housing bent to provide independent open face channels and having a web interconnecting adjacent sides of said channels and including a flange at the outer sides of and overlying said channels and extended in the plane of said web, strips of insulating material lining said channels and including parts underlying said flanges, folded resilient conductor strips mounted in said insulating strips under tension and tending to expand to thereby retain themselves and said insulating strips in said channels, said conductor strips including substantially parallel contact engaging portions arranged medially of said channels and adapted to receive therebetween contacts passed through the open face of said channel, a plate closing the open face of said channel and rested on said web and said flanges and having openings therein through which said contacts may be passed, a corner member bent transversely similarly to said metal housings and providing channels and being adapted to have one end thereof abutted with one end of said housing, independent insulated wires in the channels in said corner member, connectors including portions respectively engaged between the substantially parallel contact engaging portions of said conductor strips and having means for respectively connecting the ends of said wires thereto, and means for enclosing the channels of said corner member to retain said wires in the channels therein.

17. An electrical outlet device comprising a metallic housing having spaced channels opening through the front face thereof and a web connecting adjacent sides of said channels to provide a separating channel opening through the rear face of said housing, a metallic outlet box adapted to engage an end of said housing, connecting means in said outlet box at the end thereof abutting said housing, and attaching means secured to said connecting means and extending into said separating channel and connected to said housing for interconnecting said outlet box and said housing.

CHARLES G. BEERSMAN.